US012786103B2

(12) United States Patent
Haddad et al.

(10) Patent No.: US 12,786,103 B2
(45) Date of Patent: Nov. 3, 2026

(54) SMART LOCAL MESH NETWORKS

(71) Applicant: Telefonaktiebolaget LM Ericsson (publ), Stockholm (SE)

(72) Inventors: Wassim Michel Haddad, Palo Alto, CA (US); Heikki Mahkonen, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 435 days.

(21) Appl. No.: 18/254,849

(22) PCT Filed: May 12, 2021

(86) PCT No.: PCT/IB2021/054064
§ 371 (c)(1),
(2) Date: May 26, 2023

(87) PCT Pub. No.: WO2022/112851
PCT Pub. Date: Jun. 2, 2022

(65) Prior Publication Data

US 2024/0007388 A1 Jan. 4, 2024

Related U.S. Application Data

(60) Provisional application No. 63/119,565, filed on Nov. 30, 2020.

(51) Int. Cl.
*H04L 45/30* (2022.01)
*H04L 12/46* (2006.01)
(Continued)

(52) U.S. Cl.
CPC ........ *H04L 45/124* (2013.01); *H04L 12/4633* (2013.01)

(58) Field of Classification Search
CPC ............... H04L 45/124; H04L 12/4633; H04L 12/4641; H04L 45/30; H04L 45/64
See application file for complete search history.

(56) References Cited

U.S. PATENT DOCUMENTS

2017/0026417 A1* 1/2017 Ermagan ............. H04L 63/0428
2017/0325120 A1* 11/2017 Szilagyi .............. H04L 41/5067
(Continued)

OTHER PUBLICATIONS

International Search Report and Written Opinion for Application No. PCT/IB2021/054064, Sep. 6, 2021, 12 pages.
(Continued)

*Primary Examiner* — Nicholas A Jensen
*Assistant Examiner* — Yonghong Zhao
(74) *Attorney, Agent, or Firm* — Nicholson De Vos Webster & Elliott LLP

(57) ABSTRACT

A method that improves quality of service for user equipment in a mobile communication network implemented by a customer premise equipment. The method includes receiving any one of a session request from a user equipment with a destination, a quality of service change request from the user equipment, or a notification of congestion in the customer premise equipment, receiving mesh link information and tunnel configuration from an orchestrator, establishing a tunnel to a selected link in the mesh link information, and enabling mesh communication with the destination via the established tunnel.

14 Claims, 8 Drawing Sheets

(51) Int. Cl.
*H04L 45/12* (2022.01)
*H04L 45/64* (2022.01)

(56) References Cited

U.S. PATENT DOCUMENTS

| | | | | |
|---|---|---|---|---|
| 2018/0199218 | A1* | 7/2018 | Ashrafi | H04W 24/02 |
| 2019/0268973 | A1* | 8/2019 | Bull | H04W 92/02 |
| 2021/0036887 | A1* | 2/2021 | Meng | H04L 45/22 |
| 2021/0288881 | A1* | 9/2021 | Zhang | H04L 47/825 |
| 2021/0392477 | A1* | 12/2021 | Taft | H04W 24/02 |

OTHER PUBLICATIONS

X. Wei et al., "MPTCP proxy mechanisms draft-wei-mptcp-proxy-mechanism-02," Jul. 1, 2015, 21 pages, Internet-Draft, 2015 IETF Trust and the persons identified as the document authors.

* cited by examiner

SMART LOCAL MESH NETWORKS

CROSS-REFERENCE TO RELATED APPLICATIONS

This application is a National stage of International Application No. PCT/IB2021/054064, filed May 12, 2021, which claims the benefit of U.S. Provisional Application No. 63/119,565, filed Nov. 30, 2020, which are all hereby incorporated by reference.

TECHNICAL FIELD

Embodiments of the invention relate to the field of mobile communication networks; and more specifically, to the process and system for establishing mesh networks between edge devices to improve quality of service to user equipment in a mobile communication network.

BACKGROUND ART

Cellular or mobile communication networks (herein after referred to as 'mobile networks') are widely utilized communication networks that enable communication by user equipment (UE) via a wireless link with the remainder of the mobile network, other devices accessible via the mobile network, and other connected networks. Mobile networks are distributed over large geographical areas. The components of the mobile networks that interface with UE via the wireless communication are referred to as "cells," each cell including at least one fixed-location transceiver, but more normally, a set of transceivers referred to as a base transceiver station or base station. The base stations provide access to UEs within the cell to the mobile network, which can be used for transmission of voice, data, and other types of content. Mobile network operators (MNOs) develop and maintain the mobile networks and contract with subscribers to provide service to their respective UEs.

Mobile networks are based on evolving sets of technology to improve the quality of services and the throughput offered to UEs. An emerging technology is the $5^{th}$ Generation (5G) new radio (NR) technology as defined by the $3^{rd}$ generation partnership project (3GPP). The 5G mobile network includes a number of functions that can be distributed over any number and combination of electronic devices including the electronic devices of a base station, radio access network (RAN), and other devices in the 5G mobile network core. In a 5G mobile network, a UE can be connected to the 5G mobile network via the RAN including a next generation node base station (gNodeB) and similar components of the RAN. The RAN can include any number of gNodeBs that service any number of UEs. Various functions can be distributed to partially or completely execute at gNodeBs or related components to reduce the latency between the functions and the UEs. Computing services at the gNodeB or related components can be managed as edge services or an edge cloud platform in conjunction with computing services elsewhere in the 5G mobile network.

SUMMARY

In one embodiment, a method improves quality of service for user equipment in a mobile communication network implemented by a customer premise equipment. The method includes receiving any one of a session request from a user equipment with a destination, a quality of service change request from the user equipment, or a notification of congestion in the customer premise equipment, receiving mesh link information and tunnel configuration from an orchestrator, establishing a tunnel to a selected link in the mesh link information, and enabling mesh communication with the destination via the established tunnel.

In another embodiment, a network device implements the method to improve quality of service for user equipment in a mobile communication network. The network device includes a non-transitory machine-readable medium having stored therein a mesh manager, and a processor coupled to the non-transitory machine-readable medium, the processor to execute the mesh manager, the mesh manager to receive any one of a session request from a user equipment with a destination, a quality of service change request from the user equipment, or a notification of congestion in the customer premise equipment, receive mesh link information and tunnel configuration from an orchestrator, establish a tunnel to a selected link in the mesh link information, and enable mesh communication with the destination via the established tunnel.

In a further embodiment, a method of improving quality of service for user equipment in a mobile communication network is implemented by a network device functioning as an orchestrator. The method includes receiving a query from a customer premise equipment in the mobile communication network for additional link information to reach a destination, collecting the additional link information from customer premise equipment proximate to the querying customer premise equipment, and sending the additional link information and tunnel configuration to the querying customer premise equipment.

In one embodiment, a network device implements another process to improve quality of service for user equipment in a mobile communication network. The network device includes a non-transitory machine-readable storage medium having stored therein an orchestrator, and a processor coupled to the non-transitory machine-readable storage medium. The processor executes the orchestrator. The orchestrator receives a query from a customer premise equipment in the mobile communication network for additional link information to reach a destination, collects the additional link information from customer premise equipment proximate to the querying customer premise equipment, and sends the additional link information and tunnel configuration to the querying customer premise equipment.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
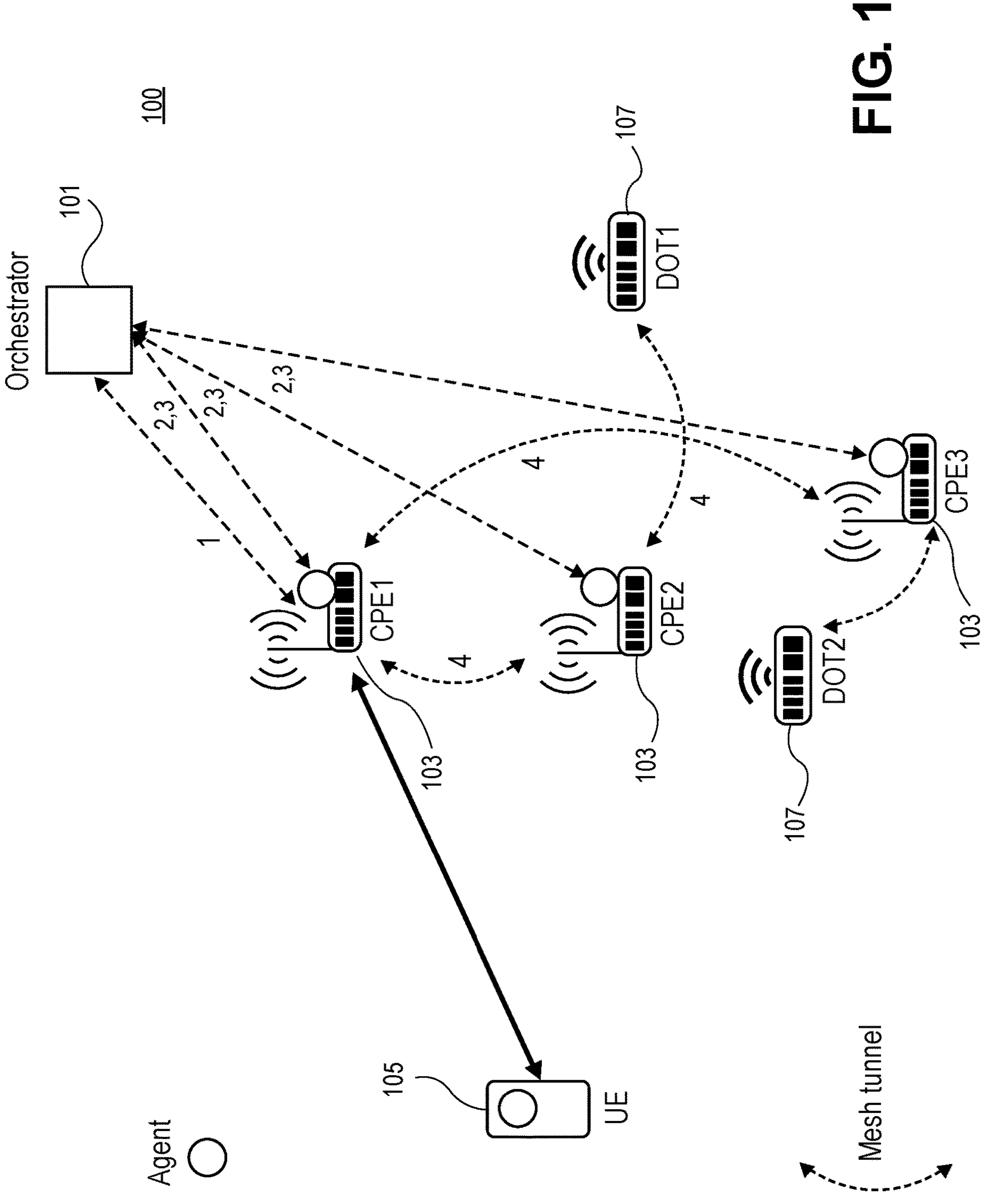
FIG. 1 is a diagram of one embodiment of a mobile communication network supporting mesh communication.

The following description describes methods and apparatus for improving quality of service for a user of a mobile device (referred to herein as user equipment) or set of users of mobile devices by use of mesh communications at the edge of a mobile communication network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

The embodiments provide a system and processes to improve user quality of service, which can also be considered user quality of experience. Quality of experience and quality of service are used interchangeably herein. Existing mobile communication networks do not leverage links that are local (e.g., links between customer premise equipment). Customer premise equipment is utilized to connect user equipment with destination devices without the involvement of other customer premise equipment. The embodiments provide a set of processes and systems that enable a set of user equipment and network devices (e.g., customer premise equipment (CPE)) to leverage available network links to 'boost' a new or ongoing session between a user equipment and a destination by establishing a local mesh network to provide alternate routes to reach the destination.

The embodiments overcome the limitations and drawbacks of the prior art, and propose a mechanism that would allow an end-user device connected to one particular network device (e.g., a CPE) running a mesh manager or similar application to leverage available links/channels on other local network devices (e.g., CPEs) to "boost" an ongoing or new communication session via establishing a local mesh network between selected network devices. The embodiments can leverage a common application or a set of applications running on all CPEs (e.g., the mesh managers) in the mobile communication network to collect accurate telemetry and transmit it to a central entity, e.g., an orchestrator, enabling the orchestrator to select additional paths in real time, e.g., depending on congestion, specific requests, and similar triggers, to configure and establish a dynamic mesh network between selected network devices (e.g., CPEs). The network devices (e.g., CPEs) can offer both fixed and mobile broadband channels.

The advantages of embodiments include establishing a mesh network to enable as many "paths" as possible within a local area, as long as they are available and can be reached by the mesh manager by means of tunneling. This is possible in the presence of an orchestrator that is capable of monitoring traffic, selecting in real time the appropriate links, configuring tunnels on the selected network devices (e.g., CPEs) as well as assigning dynamic Internet Protocol (IP) addresses to allow a particular mesh manager to "claim" selected path(s).

FIG. 1 is a diagram of one embodiment of a mobile communication network supporting mesh communication. The figure illustrates one embodiment that provides a mechanism that allows a set of network devices (e.g., CPEs) to leverage available channels to "boost" an ongoing or new session between an end-user device and a destination (e.g., a destination server or other device), via establishing dynamic local mesh networks between a selected set of CPEs.

The example mobile communication system 100 is simplified for sake of illustration and clarity. Many intermediary and connected devices are not shown for sake of conciseness. In the illustrated example, the mobile communication system 100 includes an orchestrator 101, a set of network devices 103 and 107 including CPEs 103 and other access points (e.g., DOTs 107), and a user equipment (UE) 105. One skilled in the art would appreciate that the mobile communication network 100 can support any number of UEs, network devices, and similar electronic devices that can support communication amongst themselves and with external devices and destinations.

In this example, a UE 105 is connected to the mobile communication network 100 via a network device (i.e., CPE 103). The CPE 103 is in communication with an orchestrator 101, which in turn is in communication with other access points and similar network devices 107 in the mobile communication network 100.

The UE 105 can be any type of electronic device that connects to the mobile communication network 100 via an access point such as a CPE 103. Any number and variety of UEs 105 can connect to a given access point and the mobile communication network 100. The access points 107 can be CPEs, DOTs, base stations in a radio access network, or similar mobile communication network 100 access points. The mobile communication network 100 can have any number of access points distributed over any geographical area. These access points can be connected by any number of intermediate networking devices (not shown). Each of the access points or related networking devices can execute a mesh manager (i.e., an agent as illustrated in FIG. 1) that manages communication with the orchestrator 101 and the implementation of the mesh network. The UE 105 can also include an agent that communicates with mesh managers at the access points. The UE 105 agent can be a mesh manager or similar component that enables a user to request a 'boost' or similar signal that additional quality of service/experience is requested for an associated communication session between the UE 105 and a destination that may be internal or external to the mobile communication network 100.

The agents (e.g., mesh managers) and orchestrator 101 can communicate via any shared protocol or system. These agents and orchestrator 101 can establish separate communication channels at respective system starts or any time thereafter. In some embodiments, as each access point (e.g., CPE or DOT) is connected to the mobile communication network 100, the mesh manager onboards with the orchestrator. The onboarding process can provide the orchestrator with networking, security, service parameters, and similar information about the network device executing the mesh manager. This information can be periodically updated by request of the orchestrator, on a schedule implemented by the mesh manager, or by a similar mechanism.

In some embodiments, the mesh can begin to be established in response to a user 'boost' request, an admin request, a new session request, congestion detection at the network device or orchestrator, or under similar circumstances. In one example case, the UE sends a message to the destination server. The message from the UE is processed by the mesh manager running on CPE1 103. The mesh manager queries (1) the orchestrator about additional links available to reach a destination server. The orchestrator collects telemetry (2) (i.e., additional link information and topology information) from surrounding CPEs and other network devices 107 and selects specific links on CPE2 and CPE3 to support CPE1.

The orchestrator dynamically identifies alternate routes from the network devices 107 to the destination server and configures mesh tunnels between the selected network devices 107 and the initial network device 103. The mesh tunnel configuration information (i.e., additional link information and tunnel configuration) is sent (3) to each of the network devices 103, 107 that will participate in the mesh network, which causes the network devices 103, 107 to establish mesh tunnels (4). The orchestrator can create associated virtual link interfaces on the initial network device (CPE1) to be used by the mesh manager to access mesh tunnels. The orchestrator can select an optimal, most efficient, or similar configuration of available network devices to participate in the mesh. The mesh tunneling and configuration can use any tunneling and security protocols to secure the mesh network.

In some embodiments, the mesh manager will use additional IP addresses to "virtually" attach the initial network device (CPE1) to the other network devices (e.g., CPE2 and CPE3) in order to pass signaling and data traffic as if it is physically attached to both CPE2 and CPE3. Consequently, CPE2 and CPE3 are only providing additional paths to boost a new or ongoing session.

Figure 2:
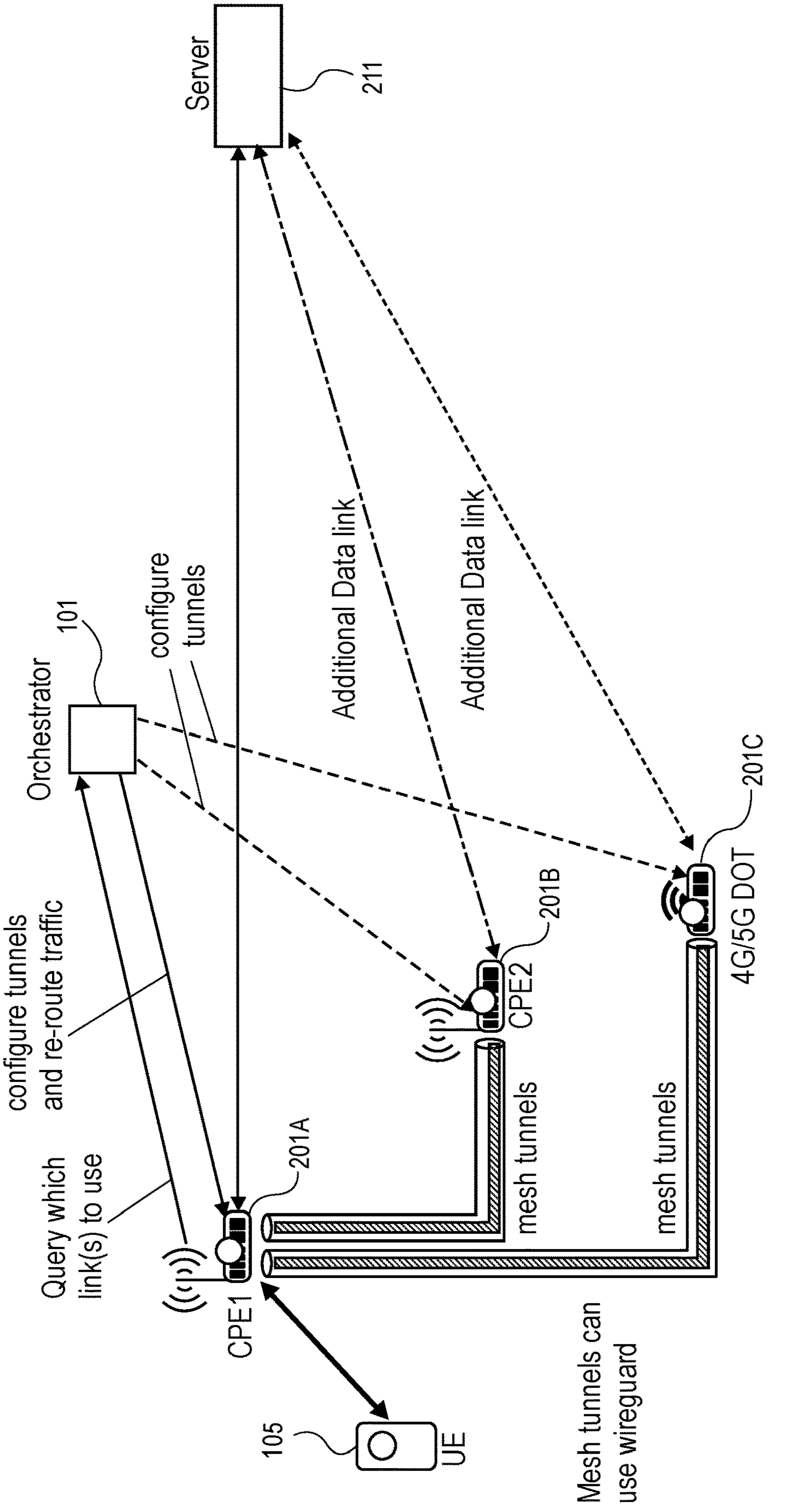
FIG. 2 is a diagram of one embodiment of a mobile communication network with a set of mesh tunnels established.

FIG. 2 is a diagram of one embodiment of a mobile communication network with a set of mesh tunnels established. In this example, a set of tunnels between the network devices 201A-C is established for the mesh network. The initial CPE1 201A in this example, can then route some or all communication over the mesh tunnels to improve a communication session between the UE 105 and the destination server 211 in terms of latency, throughput, and similar metrics by using shorter routes, additional bandwidth, or similar advantages of the mesh tunnel connections. The additional data links between the other network devices 201B and 201C and the destination server 211 can be routed via any protocol or process independent of the mesh network operation to provide the connections between these network devices and the destination server 211. Traffic can flow between the UE 105 and the destination server 211 in both directions using any combination of the initial link and the additional links.

In some embodiments, the mesh tunnels and network can utilize virtual private networking protocols such as IPsec and Wireguard, by Donenfield, to secure the connections between the endpoints in the mesh network. For example, the orchestrator can establish the secure mesh network using Wireguard protocol via remote configuration and provisioning of each node in the mesh network including the UE 105. The orchestrator can identify a mesh topology from collected networking data and translate the topology into a set of tunnel configurations and policies to be provisioned to each node in the mesh network.

Figure 3:
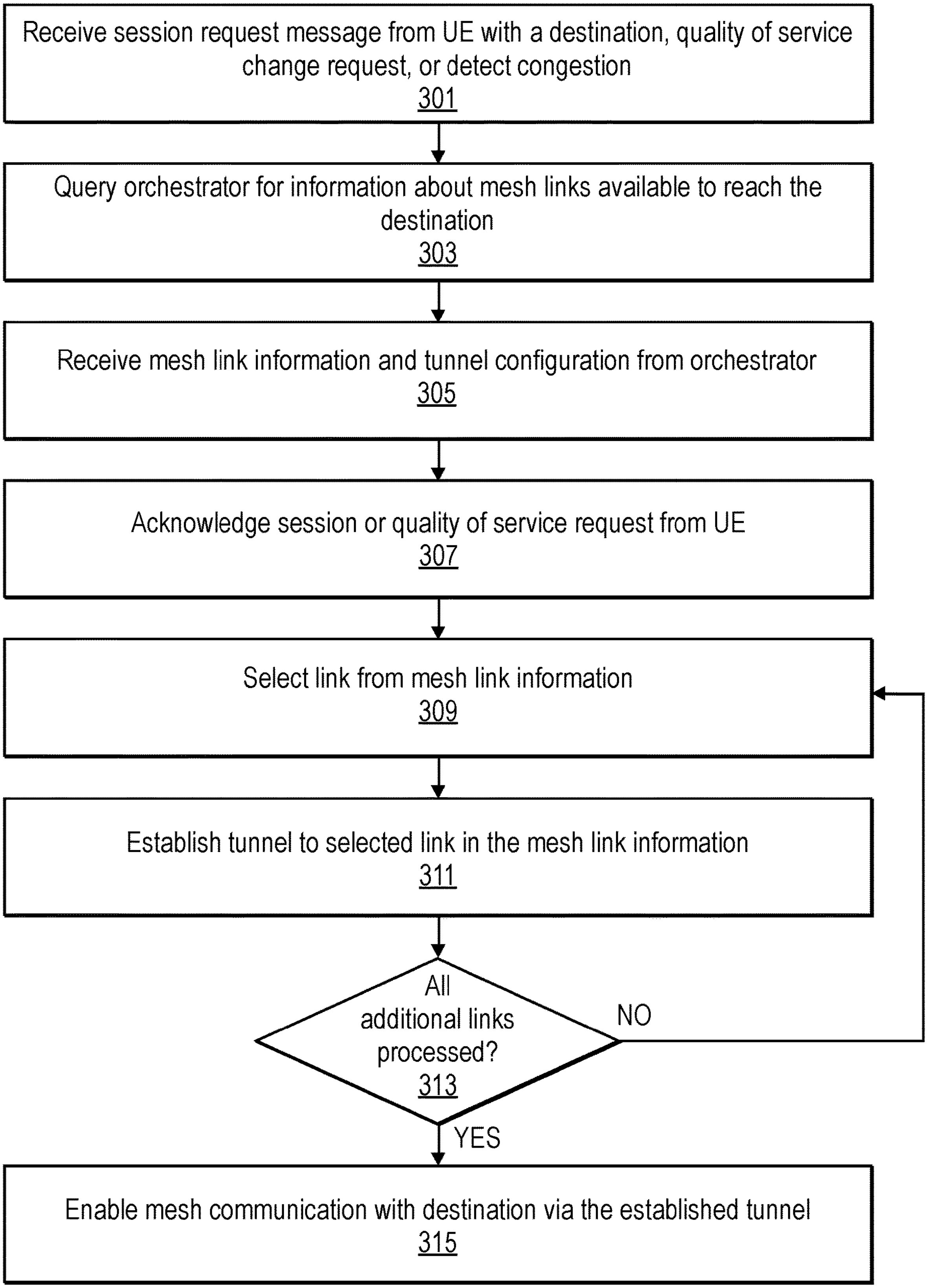
FIG. 3 is a flowchart of one embodiment of a process of a mesh manager in a customer premise equipment.

FIG. 3 is a flowchart of one embodiment of a process of a mesh manager in a customer premise equipment. The flowchart illustrates the process of the mesh manager to establish a mesh network for improving the quality of service/experience for a communication session between a UE and a destination electronic device. The process can be triggered by a mesh manager receiving a session request message from the UE to establish a new connection with a destination, a quality of service/experience change request from the UE, a detected congestion notification, a quality of service/experience change request from an administrator or a similar message that indicates that the quality of service/experience should be enhanced by the mesh manager (Block 301). These messages and notifications can be received in any format or using any protocol. The process of engaging the mesh network to improve the quality of service/experience can be applied to new or existing communication sessions between the UE and a destination. In some embodiments, the process can be applied to groups of users/UEs and associated communication sessions with a single destination or any combination of destinations.

In response to receiving any one or more of these messages, the mesh manager can query the orchestrator for information about mesh links available to reach the destination (Block 303). The orchestrator can respond with the requested information about available mesh links as well as tunnel configuration information to enable communication with the other nodes in a mesh network that is being established or the UE is being added to (Block 305). The orchestrator can establish a new mesh network to improve the quality of service/experience for the UE or can add the UE to an existing mesh network.

The mesh manager can acknowledge the request message from the UE, user, admin, or similar source (Block 307). The acknowledgement can occur any time after the receipt of the initial request (i.e., in Block 301) and can include any information related to the request processing.

Once the mesh link information is received, the mesh manager can begin to process the mesh link information to connect to each of the other nodes in the mesh network as directed by the information and tunnel configuration provided by the orchestrator. This can be done in parallel or by iterating through the received mesh link information. The iterative process is shown in the illustrated process where a next link from the mesh link information is selected to be processed (Block 309). The tunnel for the selected link is established with the corresponding node in the mesh network (Block 311). A check is then made to determine whether additional links are provided to be processed (Block 313) and the process continues to select a next link and establish the next tunnel to a node in the mesh network until all of the provided links are processed and the mesh manager has connected the network device to each of the other nodes in the mesh network at which point data traffic can be directed over the mesh network toward the destination (Block 315).

Figure 4:
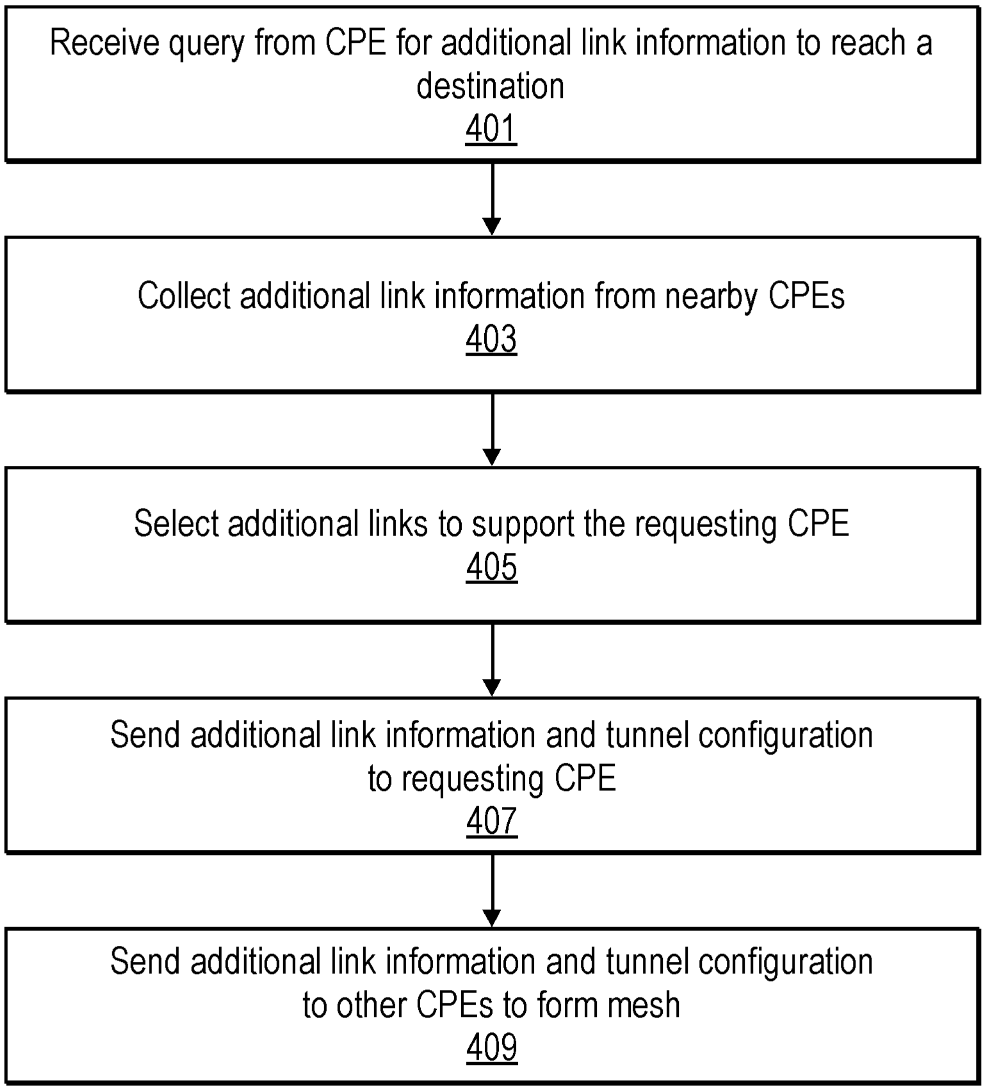
FIG. 4 is a flowchart of one embodiment of a process of an orchestrator in the mobile communication network.

FIG. 4 is a flowchart of one embodiment of a process of an orchestrator in the mobile communication network. The process of the orchestrator complements that of the mesh managers in the mobile communication network. An orchestrator can service any number of mesh managers, network devices, UEs, and similar components of the mobile communication network and can assist in establishing any number of mesh networks. In some embodiments, any number and distribution of orchestrators can be utilized within the mobile communication network to establish and manage mesh networks. Orchestrators can be implemented in any location in the mobile communication network from edge locations, to centralized locations, and combinations thereof. The functions of the orchestrator can distributed and subdivided in any manner across the mobile communication network.

In the illustrated example, the process of the orchestrator is applied to handle a single query for a mesh network. However, one skilled in the art would appreciate that the process can be adjusted to scale to any number of requests and mesh networks. In one embodiment, the process is initiated in response to a query from a mesh manager (Block 401). The query can specify a communication session and/or a destination that a UE is communicating with and being serviced by the querying mesh manager. In response to the query the orchestrator can collect additional link information for nearby network devices (Block 403). This collection can be an ongoing process of collecting telemetry from nodes in the mobile communication network, such that the mesh topology can be determined from this information. In other embodiments, the collection can be wholly or partially responsive to the query.

Once the network information of additional possible links and nodes is determined, then it can be examined to identify the links and nodes that are adjacent or that can possibly be connected with the querying UE/mesh manager. Those links and nodes that can offer additional resources or improved performance can be selected for the mesh network (Block 405). Similarly, based on the selected nodes and links, a topology of the mesh network is determined and tunneling and related configuration information is determined.

The additional link information and tunneling and related configuration information is then sent to the querying network device (Block 407). In parallel with or at or near the same time, additional link information and configuration information is sent to the other network devices that are to be nodes in the mesh network to configure them to set up or receive tunnels with the querying network device and/or other network devices in the mesh network (Block 409).

Figure 5:
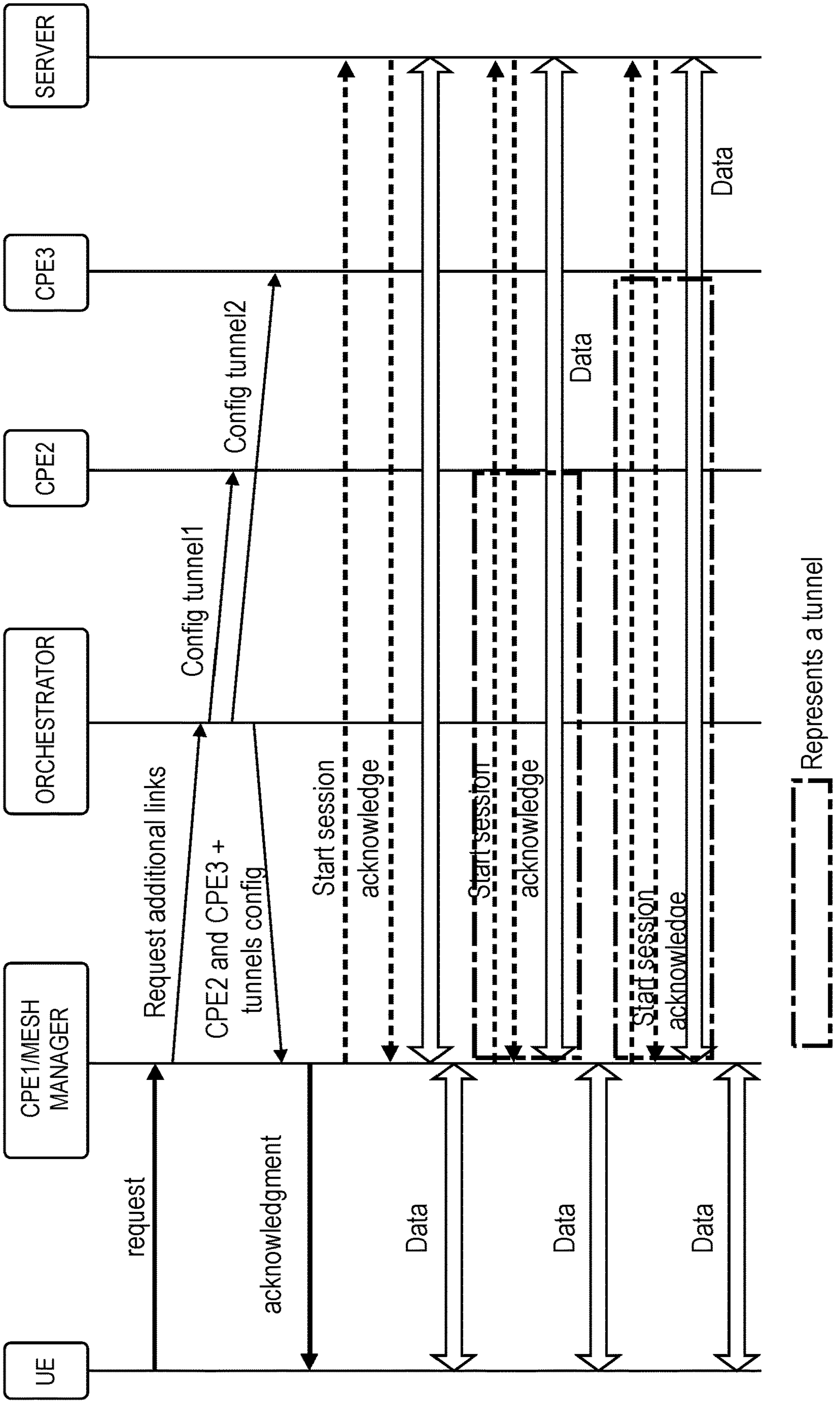
FIG. 5 is a diagram of one embodiment of the process to establish mesh communication in a mobile communication network.

FIG. 5 is a diagram of one embodiment of the process to establish mesh communication in a mobile communication network. The illustration of FIG. 5 provides timing for an example scenario where a UE is connected to a first CPE1 running the mesh manager. The CPE1 is near CPE2 and CPE3 in terms of network topology, geography, or similar metric. In this example, the UE sends a request (e.g., a 'boost' request) for improved quality of service/experience to the CPE1/mesh manager. The request can specify a particular destination or communication session. The mesh manager requests additional link information for reaching the destination or to support the communication session. The orchestrator replies with link information for nearby CPE2 and CPE3 along with tunnel configuration information to establish tunnels to each of these adjacent CPEs. In addition, the orchestrator sends tunnel configuration information to CPE2 and CPE3 to complete the mesh tunnel configuration between the three CPEs.

The mesh manager can acknowledge or signal to the UE that the request is being processed or implemented. Then the communication session with the expanded support can be continued or started (and acknowledged if new). The UE can then send data to a destination server via three routes correlated with CPE1, CPE2, and CPE3.

The described embodiments provide a process and system for enabling a mesh manager to run on a network device (e.g., a CPE) to enable leveraging multiple paths, e.g., fixed (e.g., cable, DSL) and mobile broadband (e.g., 4G/5G) in cooperation with an orchestrator. This provides a capability on the end-user device for multi-path solutions for improving quality of service/experience and/or reducing draining battery power due to simultaneous activation of multiple wireless interfaces (e.g., WiFi and 4G/5G).

The embodiment leverages paths that are not directly reachable by one network device (e.g., a CPE, assuming that multiple CPEs are also running in the same vicinity) and ensuring a priori, that these additional paths are suitable for being added to a new or ongoing session. The presence of an orchestrator capable to add new paths and configure dynamic mesh between corresponding network devices enables this operation.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 6A:
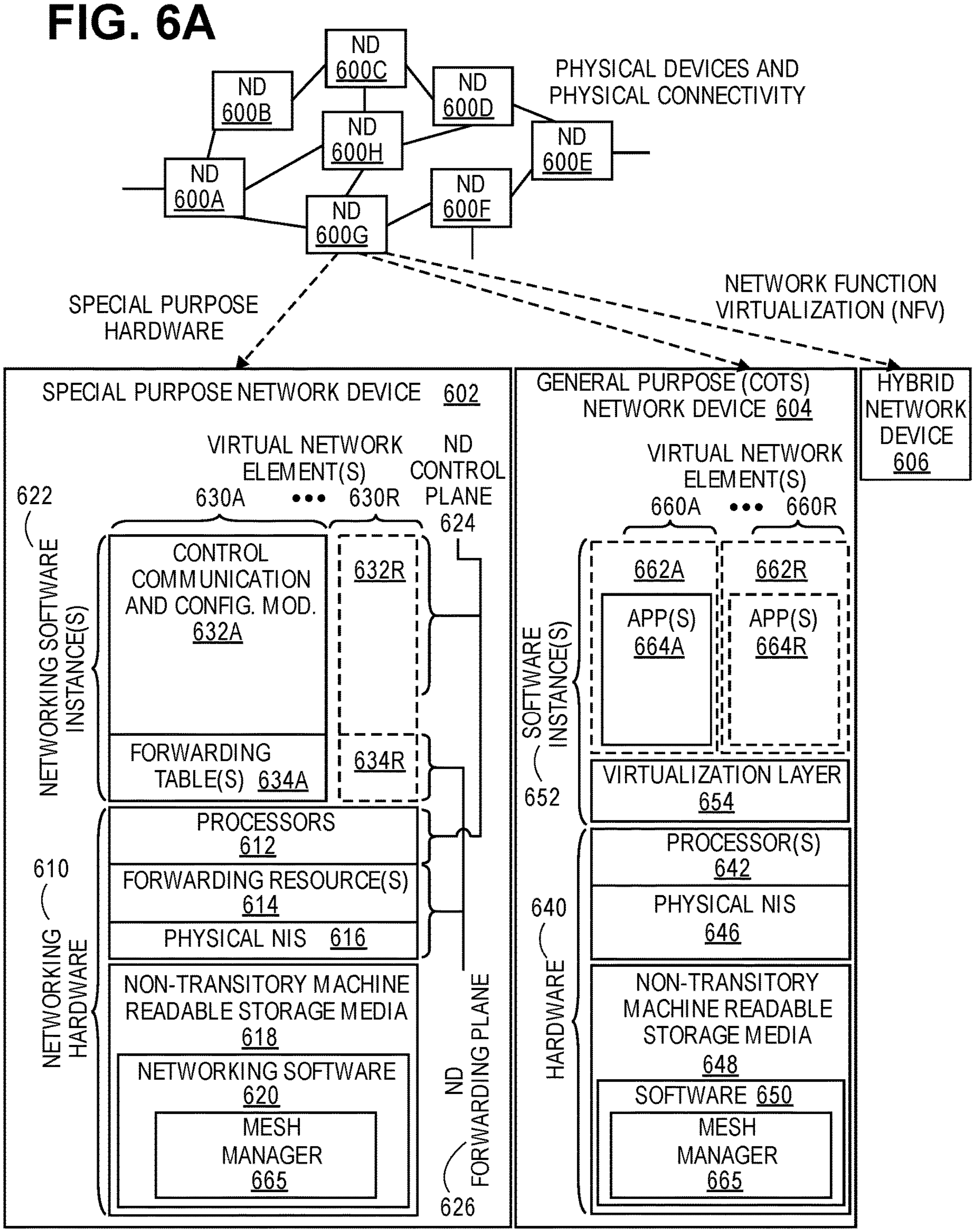
FIG. 6A illustrates connectivity between network devices (NDs) within an exemplary network, as well as three exemplary implementations of the NDs, according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between 600A-600B, 600B-600C, 600C-600D, 600D-600E, 600E-600F, 600F-600G, and 600A-600G, as well as between 600H and each of 600A, 600C, 600D, and 600G. These NDs are physical devices, and the connectivity between these NDs can be wireless or wired (often referred to as a link). An additional line extending from NDs 600A, 600E, and 600F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a special-purpose operating system (OS); and 2) a general purpose network device 604 that uses common off-the-shelf (COTS) processors and a standard OS.

The special-purpose network device 602 includes networking hardware 610 comprising a set of one or more processor(s) 612, forwarding resource(s) 614 (which typically include one or more ASICs and/or network processors), and physical network interfaces (NIs) 616 (through which network connections are made, such as those shown by the connectivity between NDs 600A-H), as well as non-transitory machine readable storage media 618 having stored therein networking software 620. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

In some embodiments, the network software 620 can include a mesh manager 665 and similar components of the embodiments. The mesh manager 665 can be executed by processors 612 of the network device 602. The mesh manager 665 can run as a software instance, firmware, application, or similar implementation.

The special-purpose network device 602 is often physically and/or logically considered to include: 1) a ND control plane 624 (sometimes referred to as a control plane) comprising the processor(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the processor(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

Figure 6B:
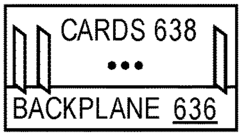
FIG. 6B illustrates an exemplary way to implement a special-purpose network device according to some embodiments of the invention.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and physical NIs 646, as well as non-transitory machine readable storage media 648 having stored therein software 650. During operation, the processor(s) 642 execute the software 650 to instantiate one or more sets of one or more applications 664A-R. While one embodiment does not implement virtualization, alternative embodiments may use different forms of virtualization. For example, in one such alternative embodiment the virtualization layer 654 represents the kernel of an operating system (or a shim executing on a base operating system) that allows for the creation of multiple instances 662A-R called software containers that may each be used to execute one (or more) of the sets of applications 664A-R; where the multiple software containers (also called virtualization engines, virtual private servers, or jails) are user spaces (typically a virtual memory space) that are separate from each other and separate from the kernel space in which the operating system is run: and where the set of applications running in a given user space, unless explicitly allowed, cannot access the memory of the other processes. In another such alternative embodiment the virtualization layer 654 represents a hypervisor (sometimes referred to as a virtual machine monitor (VMM)) or a hypervisor executing on top of a host operating system, and each of the sets of applications 664A-R is run on top of a guest operating system within an instance 662A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 640, directly on a hypervisor (in which case the unikernel is sometimes described as running within a LibOS virtual machine), or in a software container, embodiments can be implemented fully with unikernels running directly on a hypervisor represented by virtualization layer 654, unikernels running within software containers represented by instances 662A-R, or as a combination of unikernels and the above-described techniques (e.g., unikernels and virtual machines both run directly on a hypervisor, unikernels and sets of applications that are run in different software containers).

In some embodiments, the software 650 can include a mesh manager 665 and similar components of the embodiments. The mesh manager 665 can be executed by processors 642 of the network device 604. The mesh manager 665 can run as a software instance, firmware, application, or similar implementation.

The instantiation of the one or more sets of one or more applications 664A-R, as well as virtualization if implemented, are collectively referred to as software instance(s) 652. Each set of applications 664A-R, corresponding virtualization construct (e.g., instance 662A-R) if implemented, and that part of the hardware 640 that executes them (be it hardware dedicated to that execution and/or time slices of hardware temporally shared), forms a separate virtual network element(s) 660A-R.

The virtual network element(s) 660A-R perform similar functionality to the virtual network element(s) 630A-R—e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 662A-R to VNEs also apply to embodiments where such a finer level of granularity and/or unikernels are used.

In certain embodiments, the virtualization layer 654 includes a virtual switch that provides similar forwarding services as a physical Ethernet switch. Specifically, this virtual switch forwards traffic between instances 662A-R and the physical NI(s) 646, as well as optionally between the instances 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 6C:
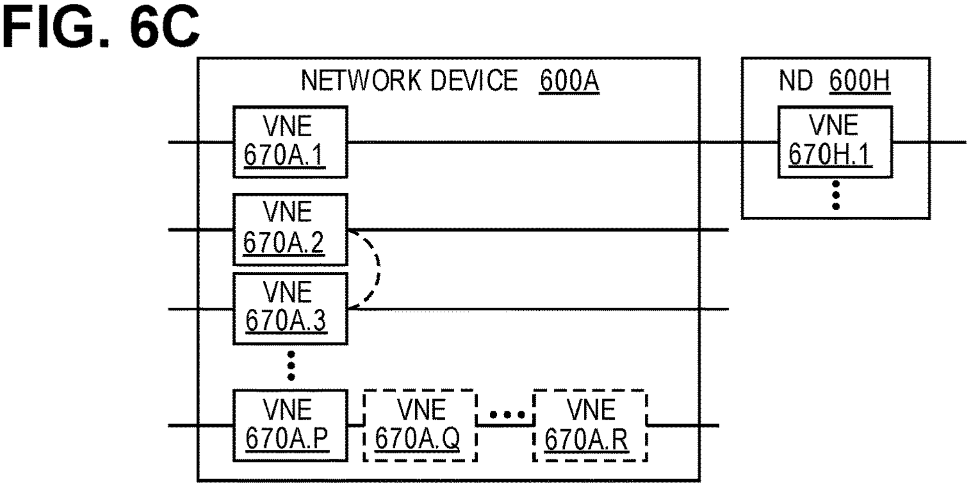
FIG. 6C illustrates various exemplary ways in which virtual network elements (VNEs) may be coupled according to some embodiments of the invention.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software instances 662A-R may operate as servers; the same would be true for the hybrid network device 606; in the case of the special-purpose network device 602, one or more such servers could also be run on a virtualization layer executed by the processor(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 6D:
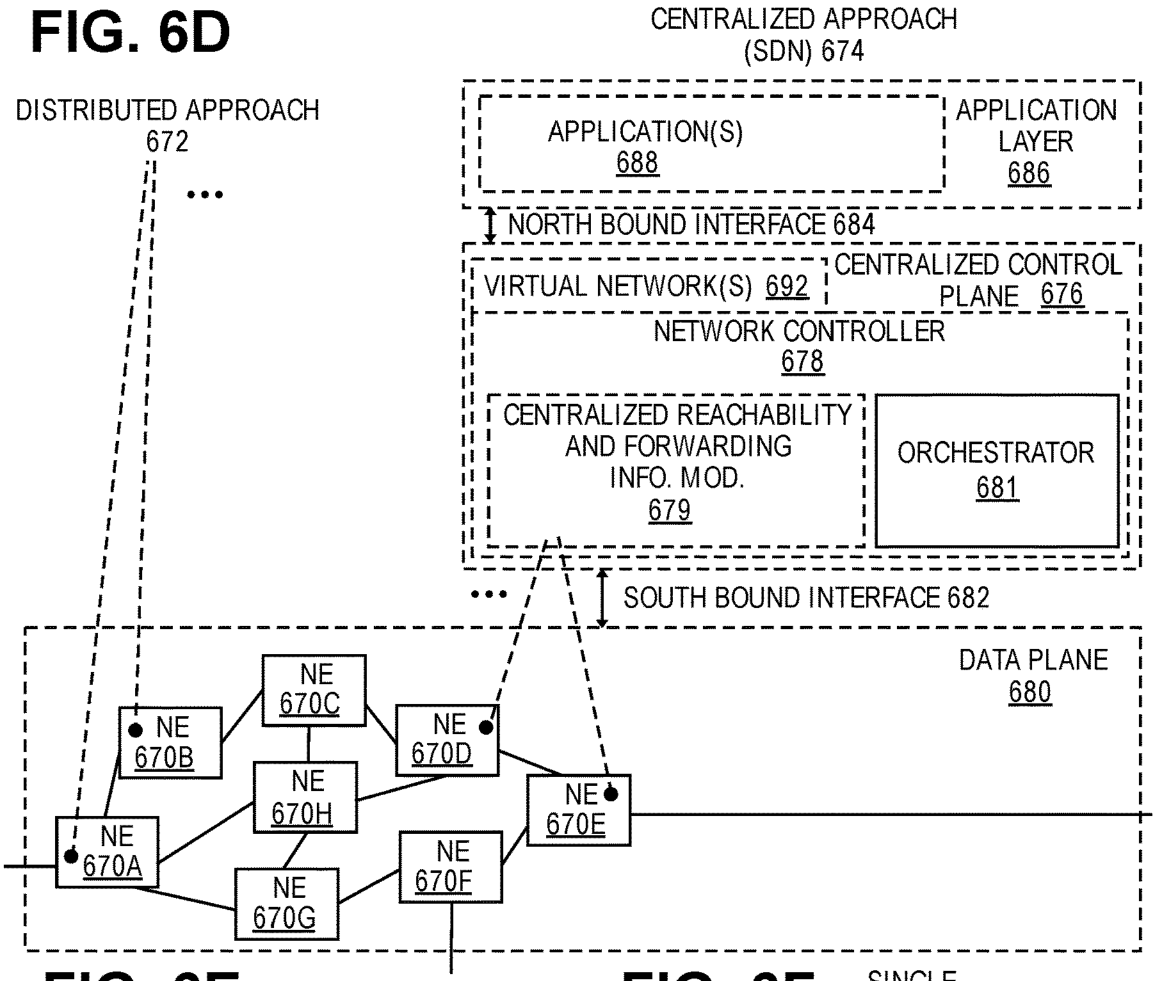
FIG. 6D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 670A-H (e.g., the processor(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs.

In some embodiments, the centralized control plane 676 can include an orchestrator 681 or mesh manager and similar components of the embodiments. The orchestrator 681 can be executed by processors of the centralized control plane 676. The orchestrator 681 or mesh manager can run as a software instance, firmware, application, or similar implementation.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the processor(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
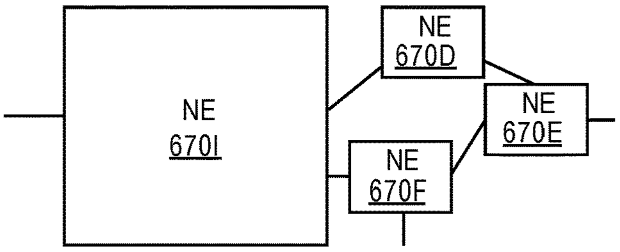
FIG. 6E illustrates the simple case of where each of the NDs implements a single NE, but a centralized control plane has abstracted multiple of the NEs in different NDs into (to represent) a single NE in one of the virtual network(s), according to some embodiments of the invention.
Figure 6F:
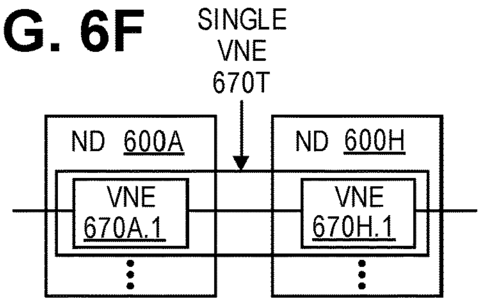
FIG. 6F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
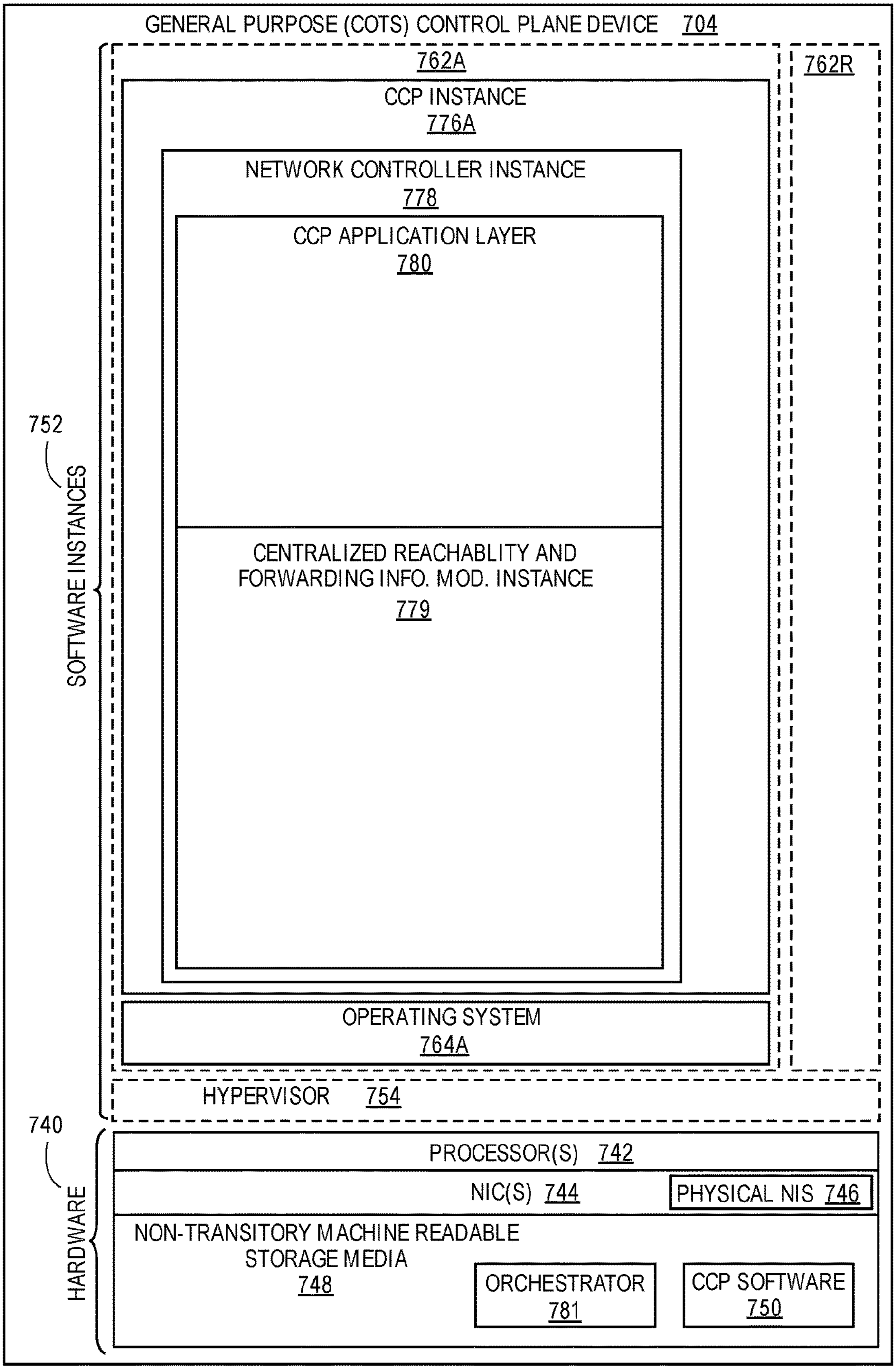
FIG. 7 illustrates a general purpose control plane device with centralized control plane (CCP) software 750), according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include processor(s), a set of one or more physical NIs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and physical NIs 746, as well as non-transitory machine readable storage media 748 having stored therein centralized control plane (CCP) software 750.

In some embodiments, the non-transitory machine-readable storage media 748 can include an orchestrator 781 or mesh manager and similar components of the embodiments. The orchestrator 781 can be executed by processors of the centralized control plane device 704. The orchestrator 781 or mesh manager can run as a software instance, firmware, application, or similar implementation.

In embodiments that use compute virtualization, the processor(s) 742 typically execute software to instantiate a virtualization layer 754 (e.g., in one embodiment the virtualization layer 754 represents the kernel of an operating system (or a shim executing on a base operating system) that allows for the creation of multiple instances 762A-R called software containers (representing separate user spaces and also called virtualization engines, virtual private servers, or jails) that may each be used to execute a set of one or more applications; in another embodiment the virtualization layer 754 represents a hypervisor (sometimes referred to as a virtual machine monitor (VMM)) or a hypervisor executing on top of a host operating system, and an application is run on top of a guest operating system within an instance 762A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 740, directly on a hypervisor represented by virtualization layer 754 (in which case the unikernel is sometimes described as running within a LibOS virtual machine), or in a software container represented by one of instances 762A-R). Again, in embodiments where compute virtualization is used, during operation an instance of the CCP software 750 (illustrated as CCP instance 776A) is executed (e.g., within the instance 762A) on the virtualization layer 754. In embodiments where compute virtualization is not used, the CCP instance 776A is executed, as a unikernel or on top of a host operating system, on the "bare metal" general purpose control plane device 704. The instantiation of the CCP instance 776A, as well as the virtualization layer 754 and instances 762A-R if implemented, are collectively referred to as software instance(s) 752.

In some embodiments, the CCP instance 776A includes a network controller instance 778. The network controller instance 778 includes a centralized reachability and forwarding information module instance 779 (which is a middleware layer providing the context of the network controller 678 to the operating system and communicating with the various NEs), and an CCP application layer 780 (sometimes referred to as an application layer) over the middleware layer (providing the intelligence required for various network operations such as protocols, network situational awareness, and user-interfaces). At a more abstract level, this CCP application layer 780 within the centralized control plane 676 works with virtual network view(s) (logical view(s) of the network) and the middleware layer provides the conversion from the virtual networks to the physical view.

The centralized control plane 676 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a first customer premise equipment (CPE) in a mobile communication network, wherein the first CPE is one of a plurality of CPEs operating in near proximity to form a mesh network, the method comprising:

receiving a session request from a user equipment to establish a session between the user equipment and a destination or a quality of service change request from the user equipment to change a quality of service for an existing session between the user equipment and the destination, wherein the destination is a server;

querying an orchestrator connected to the plurality of CPEs of the mesh network for an additional link to the destination via at least one other CPE;

receiving mesh link information and tunnel configuration information from the orchestrator for adding the additional link to the destination via a second CPE of the plurality of CPEs of the mesh network;

establishing a tunnel between the first CPE and the second CPE according to the mesh link information and the tunnel configuration information; and enabling mesh communication between the user equipment and the destination by use of a first link from the first CPE to the destination and the additional link from the first CPE to the destination, via the second CPE utilizing the tunnel.

2. The method of claim 1, further comprising:

establishing tunnels from the first CPE to other CPEs of the plurality of CPEs of the mesh network to enable mesh communication with the destination.

3. The method of claim 1, further comprising:

receiving a request to upgrade a quality of service for a group of user equipment from a user or an administrator of the mobile communication network.

4. The method of claim 3, wherein enabling mesh communication enables the group of user equipment, including the user equipment, to communicate with the destination via the mesh communication.

5. A network device for use as a customer premise equipment (CPE) comprising:

a machine-readable storage medium having stored therein a mesh manager; and a processor coupled to the machine-readable storage medium, the processor to execute the mesh manager, wherein the mesh manager causes the network device to operate as a first CPE of one of a plurality of CPEs, operating in near proximity to form a mesh network, in a mobile communication network, by performing operations to:

receive a session request from a user equipment to establish a session between the user equipment and a destination or a quality of service change request from the user equipment to change a quality of service for an existing session between the user equipment and the destination, wherein the destination is a server;

query an orchestrator connected to the plurality of CPEs of the mesh network for an additional link to the destination via at least one other CPE;

receive mesh link information and tunnel configuration information from the orchestrator for adding the additional link to the destination via a second CPE of the plurality of CPEs of the mesh network;

establish a tunnel between the first CPE and the second CPE according to the mesh link information and the tunnel configuration information; and enable mesh communication between the user equipment and the destination by use of a first link from the first CPE to the destination and the additional link from the first CPE to the destination, via the second CPE utilizing the tunnel.

6. The network device of claim 5, wherein the mesh manager further causes the network device to perform operations to:

establish tunnels from the first CPE to other CPEs of the plurality of CPEs of the mesh network to enable mesh communication with the destination.

7. The network device of claim 5, wherein the mesh manager further causes the network device to perform operations to:

receive a request to upgrade a quality of service for a group of user equipment from a user or an administrator of the mobile communication network.

8. The network device of claim 7, wherein to enable mesh communication enables the group of user equipment, including the user equipment, to communicate with the destination via the mesh communication.

9. A method implemented by a network device functioning as an orchestrator, the method comprising:

receiving a query from a first customer premise equipment (CPE) in a mobile communication network for additional link information for a session between a user equipment in the mobile communication network and a destination for the user equipment, wherein the first CPE is one of a plurality of CPEs operating in near proximity to form a mesh network and wherein the query is to establish a session between the user equipment and the destination or for a service change request to change a quality of service for an existing session between the user equipment and the destination, wherein the destination is a server;

collecting the additional link information for adding an additional link to the destination via a second CPE of the plurality of CPEs of the mesh network by establishing a tunnel between the first CPE and the second CPE; and sending the additional link information and tunnel configuration information to the first CPE to enable the tunnel for the additional link to allow use of a first link from the first CPE to the destination and the additional link from the first CPE to the destination, via the second CPE utilizing the tunnel.

10. The method of claim 9, further comprising:

receiving a request to upgrade a quality of service for a group of user equipment from a user or an administrator of the mobile communication network.

11. The method of claim 10, further comprising:

determining the additional link information to enable mesh communication for the group of user equipment, including the user equipment, to communicate with the destination via the mesh communication.

12. A network device for use as an orchestrator comprising:

a machine-readable storage medium having stored therein an orchestrator; and a processor coupled to the machine-readable storage medium, the processor to execute the orchestrator by performing operations to:

receive a query from a first customer premise equipment (CPE) in a mobile communication network for additional link information for a session between a user equipment in the mobile communication network and a destination for the user equipment, wherein the first CPE is one of a plurality of CPEs operating in near proximity to form a mesh network and wherein the query is to establish a session between the user equipment and the destination or for a service change request to change a quality of service for an existing session between the user equipment and the destination, wherein the destination is a server;

collect the additional link information for adding an additional link to the destination via a second CPE of the plurality of CPEs of the mesh network by establishing a tunnel between the first CPE and the second CPE; and send the additional link information and tunnel configuration information to the first CPE to enable the tunnel for the first CPE to use the second CPE for the additional link to allow use of a first link from the first CPE to the destination and the additional link from the first CPE to the destination, via the second CPE utilizing the tunnel.

13. The network device of claim 12, wherein the orchestrator further causes the network device to perform operations to:

receive a request to upgrade a quality of service for a group of user equipment from a user or an administrator of the mobile communication network.

14. The network device of claim 13, wherein the orchestrator further causes the network device to perform operations to:

determine the additional link information to enable mesh communication for the group of user equipment, including the user equipment, to communicate with the destination via the mesh communication.

* * * * *